US011150639B2

(12) United States Patent
Lv et al.

(10) Patent No.: US 11,150,639 B2
(45) Date of Patent: Oct. 19, 2021

(54) SYSTEM, METHOD AND COMPUTER PROGRAM PRODUCT FOR FAULT DETECTION AND LOCATION IN POWER GRID

(71) Applicant: International Business Machines Corporation, Armonk, NY (US)

(72) Inventors: Xin Jie Lv, Beijing (CN); Lingyun Wang, Beijing (CN); Wei Da Xu, Beijing (CN); Chao Zhang, Beijing (CN); Ke Xu Zou, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/285,590

(22) Filed: Feb. 26, 2019

(65) Prior Publication Data
US 2019/0187677 A1    Jun. 20, 2019

Related U.S. Application Data

(63) Continuation of application No. 15/290,637, filed on Oct. 11, 2016, now Pat. No. 10,324,459.

(51) Int. Cl.
*G05B 23/00* (2006.01)
*G05B 23/02* (2006.01)
(Continued)

(52) U.S. Cl.
CPC ......... *G05B 23/0262* (2013.01); *G06Q 10/20* (2013.01); *G06Q 50/06* (2013.01);
(Continued)

(58) Field of Classification Search
CPC ...... G05B 23/0262; G05B 2219/32222; G06Q 10/20; G06Q 50/06; H02J 13/0006;
(Continued)

(56) References Cited

U.S. PATENT DOCUMENTS 9,647,454 B2 * 5/2017 Afzal .................. H02J 3/00
2005/0067401 A1 * 3/2005 Fernandez .......... B60N 2/5678
219/497

(Continued)

FOREIGN PATENT DOCUMENTS

| CN | 104375055 A | 2/2015 |
|---|---|---|
| JP | H02-141676 A | 5/1990 |

(Continued)

OTHER PUBLICATIONS

Kayastha, N., Niyato, D., Hossain, E. and Han, Z. (2014), Smart grid sensor data collection, communication, and networking: a tutorial. Wirel. Commun. Mob. Comput., 14: 1055-1087. doi:10.1002/wcm.2258 (Year: 2014).*

(Continued)

*Primary Examiner* — Michael D Masinick
(74) *Attorney, Agent, or Firm* — Joseph Petrokaitis, Esq.; McGinn I.P. Law Group, PLLC.

(57) ABSTRACT

A method, system, and computer program product, include recording high-frequency wave data of local arid adjacent fault curves of a power grid to compare the high-frequency wave data with historical fault data to detect an actual fault region in the power grid, the power grid having a plurality of sensors distributed in the power grid, each sensor being upstream of one adjacent sensor and downstream of an other adjacent sensor.

10 Claims, 8 Drawing Sheets

(51) Int. Cl.
*G06Q 50/06* (2012.01)
*H02J 3/00* (2006.01)
*H02J 13/00* (2006.01)
*G06Q 10/00* (2012.01)

(52) U.S. Cl.
CPC ............ *H02J 3/00* (2013.01); *H02J 13/0006* (2013.01); *G05B 2219/32222* (2013.01); *H02J 2203/20* (2020.01); *Y02E 60/00* (2013.01); *Y02P 90/02* (2015.11); *Y04S 10/30* (2013.01); *Y04S 40/20* (2013.01)

(58) Field of Classification Search
CPC ......... H02J 3/00; H02J 2203/20; Y02P 90/22; Y02E 60/76; Y02E 60/74; Y04S 40/22; Y04S 10/30
See application file for complete search history.

(56) References Cited

U.S. PATENT DOCUMENTS

| | | | |
|---|---|---|---|
| 2007/0059986 A1 | 3/2007 | Rockwell | |
| 2008/0036472 A1* | 2/2008 | Collins, Jr. ............ | G01R 27/16 324/649 |
| 2010/0152910 A1 | 6/2010 | Taft | |
| 2010/0332831 A1* | 12/2010 | Shon ...................... | H04L 9/3213 713/168 |
| 2011/0004446 A1* | 1/2011 | Dorn ...................... | G01D 4/002 702/188 |
| 2012/0004867 A1* | 1/2012 | Mousavi ............ | G01R 31/3274 702/58 |
| 2012/0209539 A1 | 8/2012 | Kim | |
| 2013/0054183 A1* | 2/2013 | Afzal ................ | H02J 13/00002 702/141 |
| 2013/0218495 A1 | 8/2013 | Boone et al. | |
| 2016/0266649 A1* | 9/2016 | Wang ...................... | G06F 3/011 |
| 2016/0308345 A1 | 10/2016 | Stoupis et al. | |
| 2016/0372911 A1* | 12/2016 | Pan ........................ | H02H 3/042 |
| 2017/0074919 A1 | 3/2017 | Davidson et al. | |
| 2017/0175708 A1* | 6/2017 | Roesmann ................ | F03D 7/04 |
| 2017/0205781 A1 | 7/2017 | Brooks et al. | |

FOREIGN PATENT DOCUMENTS

| | | |
|---|---|---|
| JP | H03-251022 A | 11/1991 |
| JP | H08-94698 A | 4/1996 |
| JP | H11-42466 A | 5/1999 |
| JP | 2003-222650 A | 8/2003 |
| JP | 2008-128735 A | 6/2008 |

OTHER PUBLICATIONS

Mohd Ab Halim, Mohd Firdaus & Harun, Mohamad Haniff & Mohd Annuar, Khalil & Ahmad, Suziana. (2015). Monitoring grid frequency. Journal of Engineering and Applied Sciences. 10. 8413-8416. (Year: 2015).*

Basnet, Ram B., and Srinivas Mukkamala. "Event Detection and Localization Using Sensor Networks." ICWN. 2009. (Year: 2009).*

Mahapatro and P. M. Khilar, "Fault Diagnosis in Wireless Sensor Networks: A Survey," in IEEE Communications Surveys & Tutorials, vol. 15, No. 4, pp. 2000-2026, Fourth Quarter 2013 (Year: 2013).*

Wu, Siyu, and Jian-Qiao Sun. "Cross-level fault detection and diagnosis of building HVAC systems." Building and Environment 46.8 (2011): 1558-1566. (Year: 2011).*

United States Notice of Allowance dated Feb. 4, 2019, in U.S. Appl. No. 15/290,637.

United States Office Action dated Nov. 20, 2018, in U.S. Appl. No. 15/290,637.

United States Office Action dated Oct. 1, 2018, in U.S. Appl. No. 15/290,637.

United States Office Action dated May 25, 2018, in U.S. Appl. No. 15/290,637.

United States Office Action dated Jan. 22, 2018, in U.S. Appl. No. 15/290,637.

Mel, et al. "The NIST Definition of Cloud Computing". Recommendations of the National Institute of Standards and Technology. Nov. 16, 2015.

Xyngi, Ioanna, et al. "Coordination Between Distributed Generation Stability and Undervoltage Protection Requirements at DG Interconnection Point". International Conference on Power Systems Transients (IPST2009) in Kyoto, Japan. Jun. 3-6, 2009.

Chen, Yu, et al. "Traveling Wave Single End Fault Location Method based on Network Information". Shanghai Jiao Tong University.

Japanese Office Action dated Mar. 10, 2021, in corresponding Japanese Patent Application No. 2019-517276, with an English translation thereof.

Chinese Office Action dated May 25, 2021, in corresponding Chinese Patent Application No. 201780063123.1, with an English translation thereof.

* cited by examiner

SYSTEM, METHOD AND COMPUTER PROGRAM PRODUCT FOR FAULT DETECTION AND LOCATION IN POWER GRID

CROSS-REFERENCE TO RELATED APPLICATIONS

The present application is a Continuation Application of U.S. patent application Ser. No. 15/290,637, filed on Oct. 11, 2016, the entire contents of Which are hereby incorporated by reference.

BACKGROUND

The present invention relates generally to a system for fault detection, and more particularly, but not by way of limitation, to a system, method, and computer program product used for detecting and locating a Emit in a power grid.

A power grid is an interconnected grid for delivering electricity from suppliers to consumers. Generally, the power grid includes generating stations that produce electrical power, high voltage transmission lines that carry power from distant sources to demand centers, distribution lines (such as overhead lines, underground lines, or a combination thereof) that connect individual consumers, and so forth.

Power supply reliability is an essential requirement in the power grid because a power failure impacts the life and production of the consumers severely. For example, when a power line has a short circuit, the power supply will stop and leave many consumers without power. Generally, because of the complex grid topology, varied devices and various uncertain factors, it needs to take too much tilde to detect and locate the fault so as to recover the power supply from power outage.

SUMMARY

In an exemplary embodiment, the present invention can provide a system for fault detection, include a processor, and a memory, the memory storing instructions to cause the processor to perform obtaining a dataset related to a power grid collected by a plurality of sensors distributed in the power grid, identifying a region as a candidate fault region based on first data in the dataset, the first data being collected by a first sensor from among the plurality of sensors that is located in the region, and verifying the candidate fault region based on second data in the dataset, the second data being collected by a second sensor from among the plurality of sensors that is adjacent to the first sensor.

One or more other exemplary embodiments include a computer program product and a system.

Thereby, the exemplary embodiments described above may provide a fault detection system in which the fault region is determined not only based on the data collected by a local sensor, but also based on the data collected by other sensor(s) adjacent to the local sensor, thus providing the advantageous contribution to the art of significantly enhancing the efficiency and the accuracy of fault detection and location by comprehensively considering the data collected by the local sensor and the adjacent sensor(s).

Even further, in an optional embodiment, the identifying a region as a candidate fault region can include retrieving historical fault data collected by the plurality of sensors from a repository, determining a second similarity between the first data and the historical fault data, and identifying the region as the candidate fault region by comparing the second similarity with a second threshold.

Thus, if the second similarity is below the second threshold, the first data is not likely to he faulted. Thus, the region (is identified as a non-fault region. AS such, the new obtained data from a specific sensor can be compared to the historical fault data previously collected by all sensors, and thus the fault region can be identified fast and accurately.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

Figure 1:
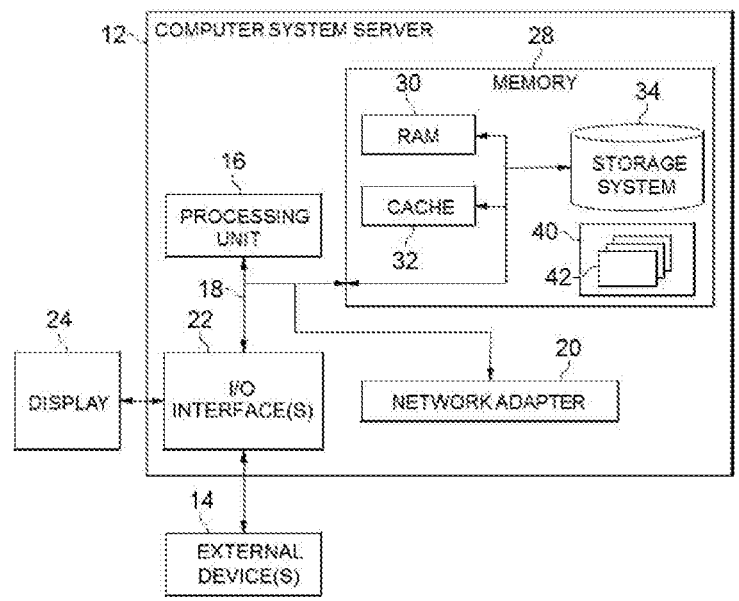
FIG. 1 depicts a cloud computing node 10 according to an embodiment of the present invention.

The invention will now be described with reference to FIG. 1-9, in which like reference numerals refer to like parts throughout. It is emphasized that, according to common practice, the various features of the drawing are not necessarily to scale. On the contrary, the dimensions of the various features can be arbitrarily expanded or reduced for clarity, With reference now to the example depicted in FIGS. 3-7, the methods 300 (400, 500, 600, 700) includes various steps to identify a region as a candidate fault region based on a first data in a dataset and verify the candidate fault region based on a second data in the dataset. As shown in at least FIG. 1, one or more computers of a computer system 12 according to an embodiment of the present invention can include a memory 28 having instructions stored in a storage system to perform the steps of FIGS. 3-7.

Although one or more embodiments (see e,g., FIGS. 1 and 8-9) may be implemented in a cloud environment 50 (see e.g., FIG. 8), it is nonetheless understood that the present invention can be implemented outside of the cloud environment.

Figure 2:
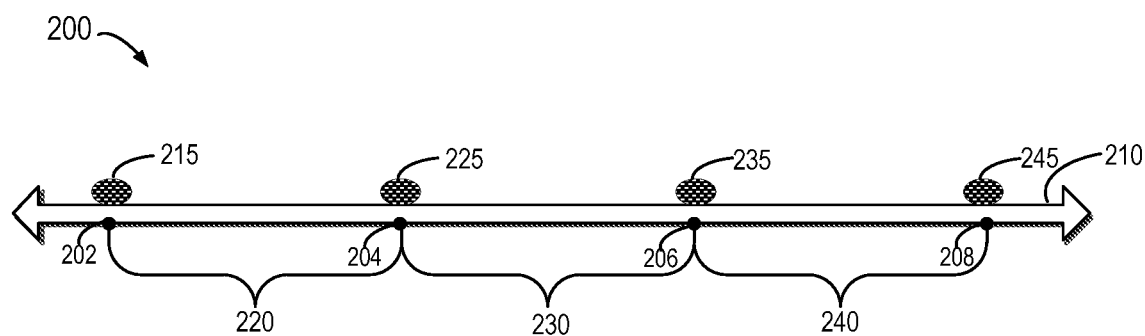
FIG. 2 is schematic diagram illustrating a part of example power grid mounting a plurality of sensors in accordance with embodiments of the present disclosure.

With reference to FIG. 2, FIG. 2 shows a schematic diagram illustrating a part of example power grid 200 mounting a plurality of sensors in accordance with embodiments of the present disclosure. As used herein, the power grid may refer to a transmission grid, a distribution grid or a combination thereof.

As shown in FIG. 2, the power grid 200 includes a power line 210, which is divided into multiple regions, such as a region 220 between locations 202 and 204, a region 230 between locations 204 and 206 and a region 240 between locations 206 and 208. Optionally, each region may have a same range such as one kilometer in length. Alternatively, different regions may have different ranges. As shown, a plurality of sensors are amounted on power line 210 in order to record the data related to the power grid 200. For example, a sensor 215 is located at the location 202, a sensor 225 is located at the location 204, a sensor 235 is located at the location 206, and a sensor 245 is located at the location 208. In some embodiments, the sensors are wrapped around the power line 210 to collect grid data. For example, the data collected by the sensor 225 may indicate a fault of an upstream region (such as the region 220) and/or a fault of a downstream region (such as the region 230). It is to be understood that although only one power line 210 is shown, the power grid 200 may include any suitable number of power lines. It is to be understood that although three regions 220, 230, 240 and four sensors 215, 225, 235, 245 are shown, the power line 210 may include any suitable number of regions and sensors.

In some embodiments, if there are multiple power lines (such as three power lines) at the location 204, the sensor 225 may be big enough to collect wave data from the three power lines.

Alternative, each power line may mount a sensor at the location 204, for example, there are a group of three sensors at the location 204. In this case, the sensor 225 may represent the group of three sensors at the location 204. In this way, the three phase wave data may be collected together by the sensor 225.

The sensor (such as the sensor 225) may record the data (such as electric current or field) flowing through a location (such as the location 204), and may send the recorded data to a computer or server (such as the computer system/server 12 as shown in FIG. 1) over a network (not shown). Examples of the network includes, but is not limited to, a wireless network, such as a local area network ("LAN"), a metropolitan area network ("MAN") a wide area network ("WAN") or the Internet, a communication network, a near field communication connection or any combination thereof.

Figure 3:
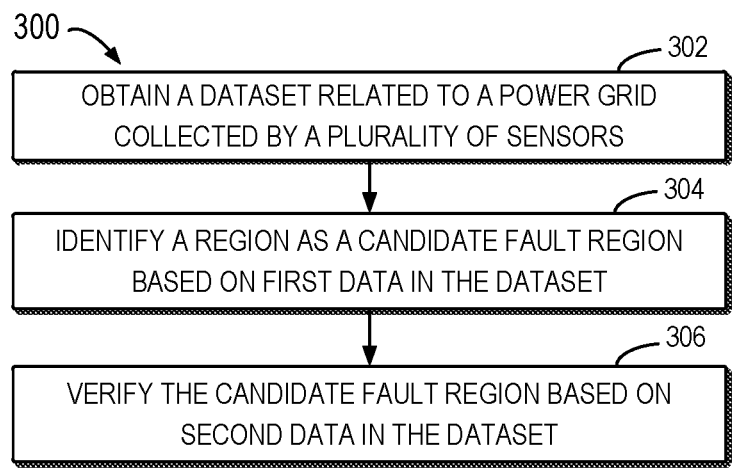
FIG. 3 is a flowchart of a method for detecting a fault region in a power grid in accordance with embodiments of the present disclosure.

FIG. 3 is a flowchart of a method 300 for detecting a fault region in a power grid in accordance with embodiments of the present disclosure. As used herein, the fault region represents a grid region (for example, a piece of power line) in which one or more electrical devices or one or more power lines have a fault. For example, the power grid may be divided logically such that a grid region between two adjacent sensors represents a region.

At 302, a dataset related to the power grid is obtained, and the dataset is collected by a plurality of sensors distributed in the power grid. For example, as shown in FIG. 2, the plurality of sensors 215, 225, 235, 245 are mounted in the power grid 200, and each in the plurality of sensors may be a fault recorder that records electric current, electric field or a combination thereof in the power grid 200. For example, the dataset includes at least data (referred to as "first data") collected by a sensor 225 (referred to as "first sensor") and data (referred to as "second data") collected by a sensor 235 (referred to as "second sensor").

In some embodiments, the data in the dataset may be high frequency wave data on the unit of a few cycles that indicates the electric current, electric field or a combination thereof. The inventors found that the generation of a fault in the power grid is an instant process, and the high frequency wave data can accurately and clearly reflect the scenario in which the fault is being generated. Thus, by recording and comparing the high frequency wave data, a more accurate detection result can be obtained. It is to be understood that although the high frequency wave data is used as an example in the embodiments of the present disclosure, other types of data may be possible.

At 304, a region (such as the region 220 and/or the region 230) is identified as a candidate fault region based on first data collected by the first sensor (such as the sensor 225). For example, a curve of the electric current or electric field may be extracted from the high frequency wave data collected by the sensor 225. If the curve indicates a fault at the downstream region of the sensor 225, the region 230 is determined, as the candidate fault region. That is, the candidate fault region is identified preliminarily based only on the data collected by the sensor 225. Some implementations of action 304 will be discussed below with reference to FIGS. 4-5.

At 306, the candidate fault region (such as the region 230) is verified based on the second data collected by the second sensor (such as the sensor 235), and the second sensor is adjacent to the first sensor (such as the sensor 225). For example, if the second data support the conclusion that the candidate fault region has a fault, then the candidate fault region is verified successfully; otherwise, the candidate fault region is not verified successfully. That is, the candidate fault region is further verified based on the data collected by one or more sensors (such as the sensor 235) adjacent to the local sensor 225. For example, if the first data collected by the sensor 225 indicates a downstream fault, while the second data collected by the sensor 235 indicates an upstream fault, then the region 230 is verified as a fault region. Optionally, the verified candidate fault region may then be provided to maintenance persons in the power grid. Some implementations of action 306 will be discussed below with reference to FIG. 7.

According to the method 300 of the present disclosure, the fault region is determined not only based on the data collected by a local sensor, but also based on the data collected by other sensor(s) adjacent to the local sensor. Thus, by comprehensively considering the data collected by the local sensor and the adjacent sensor(s), the efficiency and the accuracy of fault detection and location can be significantly enhanced.

Figure 4:
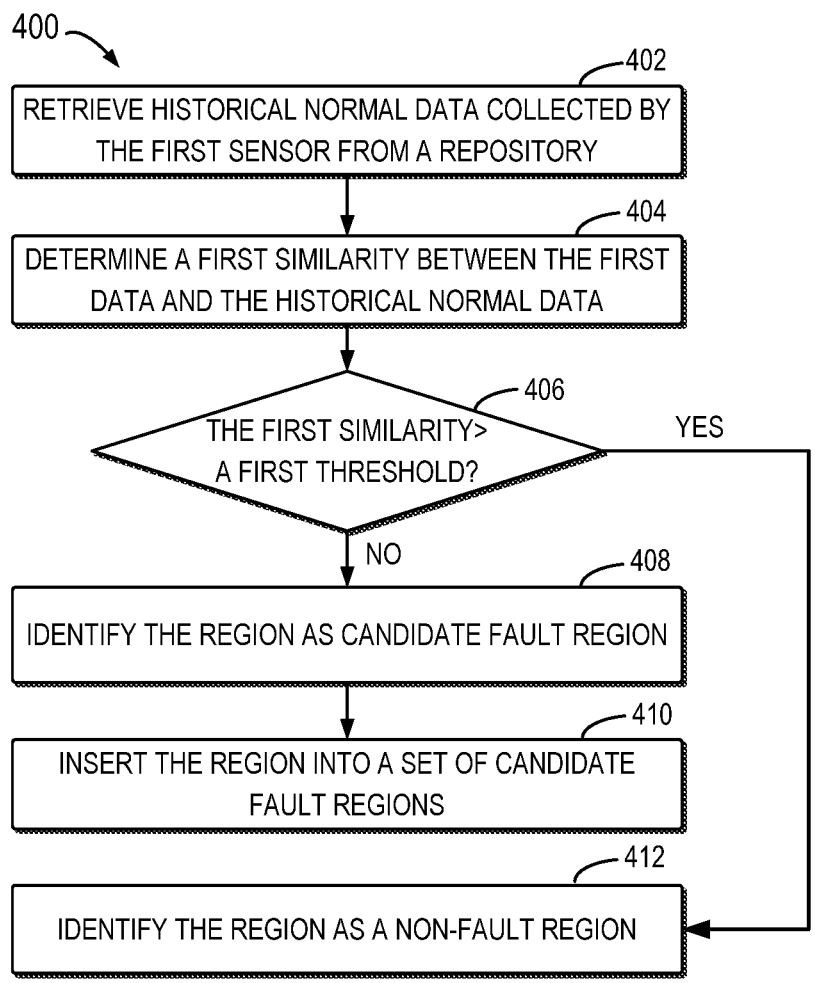
FIG. 4 is a flowchart of a method for identifying a region as a candidate fault region in accordance with embodiments of the present disclosure.

FIG. 4 is a flowchart of a method 400 for identifying a region as a candidate fault region in accordance with embodiments of the present disclosure. It will be understood that the method 400 may be regarded as a specific implementation of action 304 in the method 300 with respect to FIG. 3.

At 402, historical normal data that was previously collected by the first sensor is retrieved from a repository. For example, the repository stores the historical normal data of the plurality of sensors, and the historical normal data may be wave data representing a marked normal process.

At 404, a similarity (referred to as "a first similarity") between the first data and the historical normal data is determined. For example, the first data collected by the sensor 225 is compared to the historical normal data in the repository previously collected by the sensor 225 in order to determine whether the new obtained data is normal. Any suitable technology, either currently known or to be developed in future, can be applied to determine the similarity between two data. At 406, it is determined whether the first similarity is greater than a predefined threshold, referred to as "a first threshold".

If the first similarity is below the first threshold, it means that the first data might be abnormal, and it may indicate an upstream and/or downstream fault. At this point, at 408, a region (for example a downstream region, such as the region 230) is identified as a candidate fault region based on the data collected by the sensor 225. Then, the region 230 is inserted into a set of candidate fault regions for subsequent verification at 410.

On the other hand, if the first similarity is greater than the first threshold, it means that the first data is likely to be normal, and thus the region (such as the region 230) is identified as a non-fault region at 412. As such, the new obtained data from a specific sensor can be compared to the historical normal data previously collected by the same specific sensor, and thus the fault region can be identified fast and accurately.

Figure 5:
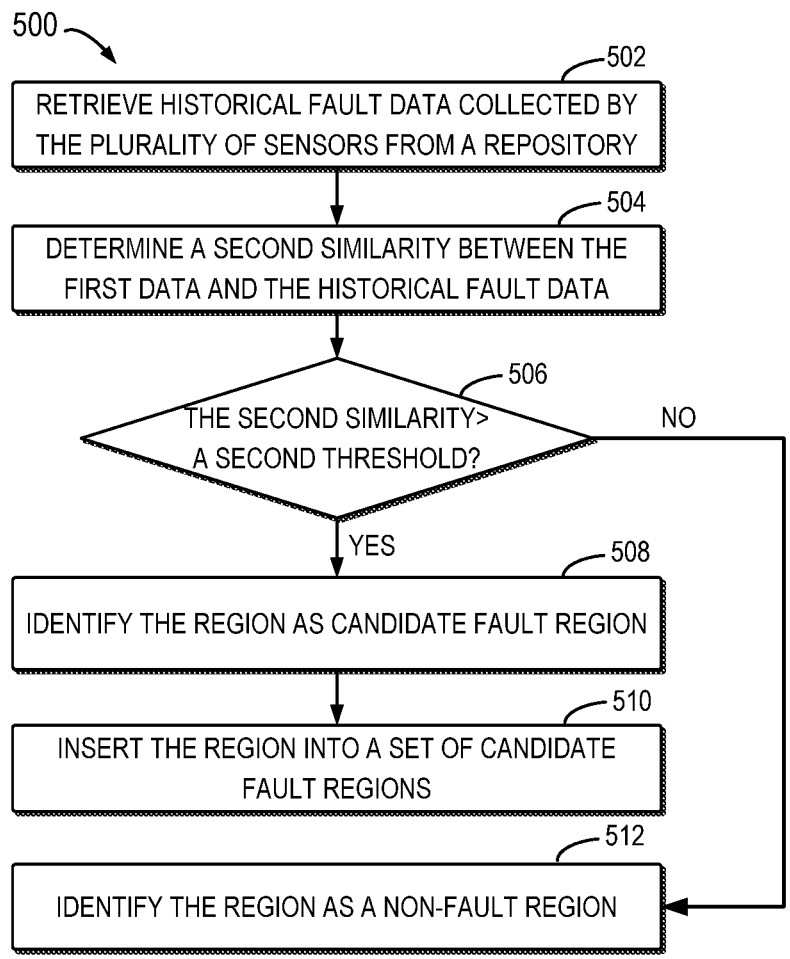
FIG. 5 is a flowchart of another method for identifying a region as a candidate fault region in accordance with embodiments of the present disclosure.

FIG. 5 is a flowchart of another method 500 for identifying a region as a candidate fault region in accordance with embodiments of the present disclosure. It will be understood that the method 500 may be regarded as another specific implementation of action 304 in the method 300 with respect to FIG. 3.

At 502, historical fault data collected by the plurality of sensors is retrieved from a repository. For example, the repository stores the historical fault data of all sensors, and the historical fault data may be wave data representing a marked abnormal process.

At 504, a similarity (referred to as "a second similarity") between the first data and the historical fault data is determined. For example, the first data collected by the sensor 225 is compared to the historical fault data in the repository previously collected by all the sensors in order to determine whether the first data is faulted.

At 506, it is determined whether the second similarity is greater than a predefined threshold, referred to as "a second threshold". If the second similarity is greater than the second threshold, it means that the first data might be faulted, and it may indicate an upstream and/or downstream fault. At this point, at 508, a region (for example a downstream region, such as the region 230) is identified as a candidate fault region at 508 based on the data collected by the sensor 225. Then, the region 230 is inserted into a set of candidate fault regions for subsequent verification at 510.

If the second similarity is below the second threshold, it means that the first data is not likely to be faulted. Thus, at 512, the region (such as the region 230) is identified as a non-fault region. As such, the new obtained data from a specific sensor can be compared to the historical fault data previously collected by all sensors, and thus the fault region can be identified fast and accurately.

Figure 6:
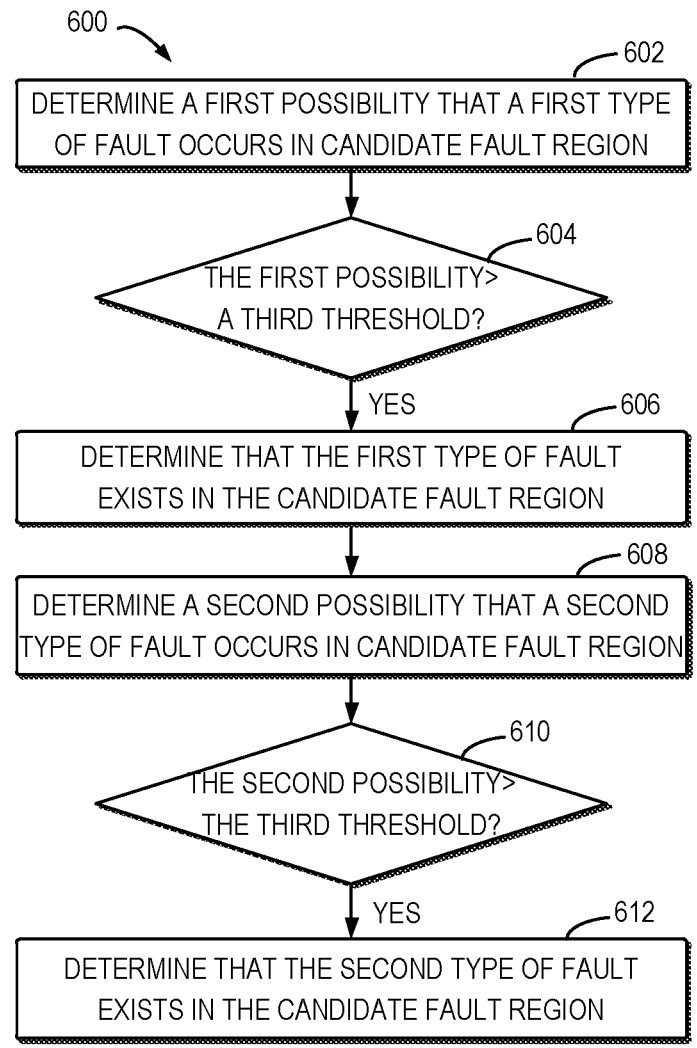
FIG. 6 is a flowchart of a method for determining one or more faults for a candidate fault region in accordance with embodiments of the present disclosure.

FIG. 6 is a flowchart of a method 600 for determining one or more faults for a candidate fault region in accordance with embodiments of the present disclosure. It will be understood that the method 600 may start after identifying a region as a candidate fault region in action 306 in the method 300 with respect to FIG. 3.

At 602, a possibility (referred to as "a first possibility") that one type (referred to as "a first type") of fault occurs in the candidate fault region is determined based on the first data, and the fault type may be a short circuit, an open circuit, an overvoltage or an overcurrent. At 604, it is determined whether the first possibility is greater than a predefined threshold (referred to as "a third threshold"). If not, it means that no first type of fault is found in the first data. Otherwise, if the first possibility is greater than the third threshold, it is determined that the first type of fault exists in the candidate fault region at 606.

At 608, a possibility (referred to as "a second possibility") that another type (referred to as "a second type") of fault occurs in the candidate fault region is determined, and the first and second fault types are different from each other. At 610, it is determined whether the second possibility is greater than the third threshold. If not, it means that no second type of fault is found in the first data. Otherwise, if the second possibility is greater than the third threshold, it is determined that the second type of fault exists in the candidate fault region at 612.

It is to be understood that although two types of faults are detected in the method 600, more than two type types of faults may be detected in the first data. Besides, it is also possible to detect only one type of fault in the first data. As such, one or more types of faults may be detected based the data collected by a sensor.

It is to be understood that although a set of actions 602-606 is shown prior to actions 608-612, this is merely for the purpose of illustration without suggesting any limitation as to the scope of the present disclosure. In some embodiments, the set of actions 602-606 and the set of actions 608-612 may be carried out in parallel.

In some embodiments, the actions 602 and 608 in the method 600 may be performed simultaneously by means of an equation. That is, the first possibility and second possibility can be computed together. For example, for the first data, the possibilities (for example the first and second possibilities) for various types of faults may be determined as below:

$$y=Ax_0=[A_1, A_2, \ldots, A_p]x_0=[a_{11}, \ldots, a_{1n_1}, a_{21}, \ldots, a_{2n_2}, \ldots, a_{p1}, \ldots, a_{pn_p}]x_0\hat{x}_0=\arg\min\|x_0\|_1$$
$$s.t.\|y-Ax_0\|_2\leq\beta \qquad (1)$$

where y, denotes the first data, $x_0$ denotes a set of coefficients representing possibilities for various types of faults respectively. A denotes a set of historical fault data, $A_p$ denotes the subset of the p-th type of fault data, $a_{pn_p}$ denotes the $n_p$-th fault data in the subset $A_p$. Moreover, $\hat{x}_0$ denotes the optimal solution, β denotes the error threshold. By means of the equation (1), the possibility for each type of fault in the first data may be determined respectively. Then, the fault for which possibility being above the third threshold may be added into a set of possible faults.

Figure 7:
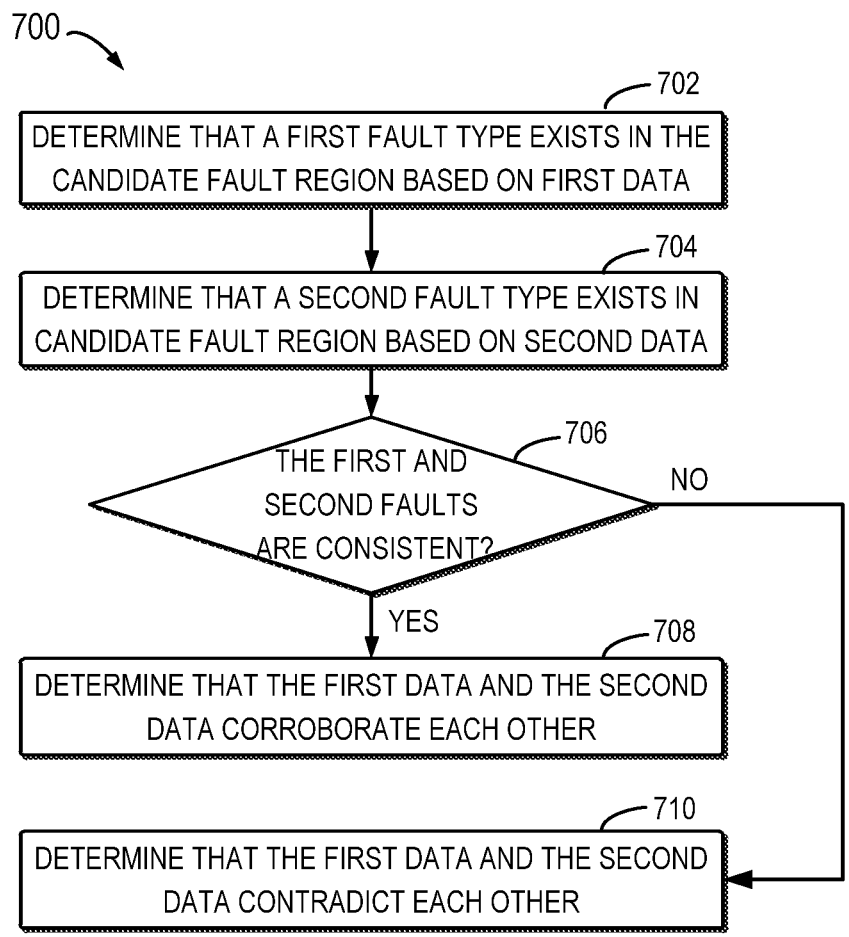
FIG. 7 is a flowchart of a method for verifying the candidate fault based on data collected by adjacent sensors in accordance with embodiments of the present disclosure.

FIG. 7 is a flowchart of a method 700 for verifying the candidate fault based on data collected by adjacent sensors in accordance with embodiments of the present disclosure. For example, in the method 700, the candidate fault region may be verified by determining whether a collision exists between the first and second data. It will be understood that the method 700 may be regarded as a specific implementation of action 306 in the method 300 with respect to FIG. 3.

At 702, a first fault type existing in the candidate fault region (such as the region 230) is determined based on the first data collected by the first sensor (such as the sensor 225). For example, a fault type for a candidate fault region may be determined based on data collected by a sensor through the equation (1). In some embodiments, the first data collected by the sensor 225 may not only indicate a possibility for at least one fault in the region 230, but also indicate a possibility for at least one fault in the regions 220 and 240.

At 704, a second fault type existing in the candidate fault region (such as the region 230) is determined based on the second data collected by the second sensor (such as the sensor 235). That is, the second data collected by the sensor 235 may also indicate a possibility for a fault in the region 230.

At 706, it is determined whether the first and second fault types are consistent. If the first and second fault types are consistent, at 708, it is determined that the first data and the second data corroborate each other. Otherwise, at 710, it is determined that the first data and the second data contradict each other.

In some embodiments, if the first data and the second data corroborate each other, then the candidate fault region is verified successfully. Otherwise, the candidate fault region is not verified successfully. For example, if the first and second fault types are both three phase short circuit, the candidate fault region (for example the region 230) may be determined to have a short circuit. In some embodiments, if the first and second data corroborate each other, then the first and second data may be correlated in order to combine the first and second fault types into a fault type with a higher fault possibility. For example, it may be determined that the region 230 have a fault of the three phase short circuit.

In another embodiment, if the first data and the second data corroborate each other, a possibility for the first fault type may be increased, and if the first data and the second data contradict each other, the possibility for the first fault type may be decreased. Then, it is determined whether the possibility is greater than a predefined threshold. If so, the candidate fault region is verified successfully. Otherwise, the candidate fault region is not verified successfully.

According to the method 700 of the present disclosure, the candidate fault region can be verified based on both the first and second data collected by adjacent sensors. Thus, by comparing the conclusions drawn by different data, the accuracy of fault detection and location can be significantly enhanced.

Exemplary Aspects, Using Cloud-Computing Environment

Although this detailed description includes an exemplary embodiment of the present invention in a cloud-computing environment, it is to be understood that implementation of the teachings recited herein are not limited to such a cloud-computing environment. Rather, embodiments of the present invention are capable of being implemented in conjunction with any other type of computing environment now known or later developed.

Cloud-computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least live characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassured according to demand. There is a sense of location independence in that the consumer generally has no control or knowledge over the exact location of the provided resources but may be able to specify location at a higher level of abstraction (e.g., country; state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (Paas): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services, Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud-computing environment is service oriented with a focus on statelessness, low coupling, modularity, and semantic interoperability. At the heart of cloud-computing is an infrastructure comprising a network of interconnected nodes.

Referring now to FIG. 1, a schematic of an example of a cloud-computing node is shown. Cloud-computing node 10 is only one example of a suitable node and is not intended to suggest any limitation as to the scope of use or functionality of embodiments of the invention described herein. Regardless, cloud-computing node 10 is capable of being implemented and/or performing any of the functionality set forth herein, Although cloud-computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud-computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud-computing environments where tasks are performed by remote processing circuits that are linked through a communications network. In a distributed cloud-computing environment, program modules may be located in both local and remote computer system storage media including memory storage circuits.

Referring again to FIG. 1, computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 8:
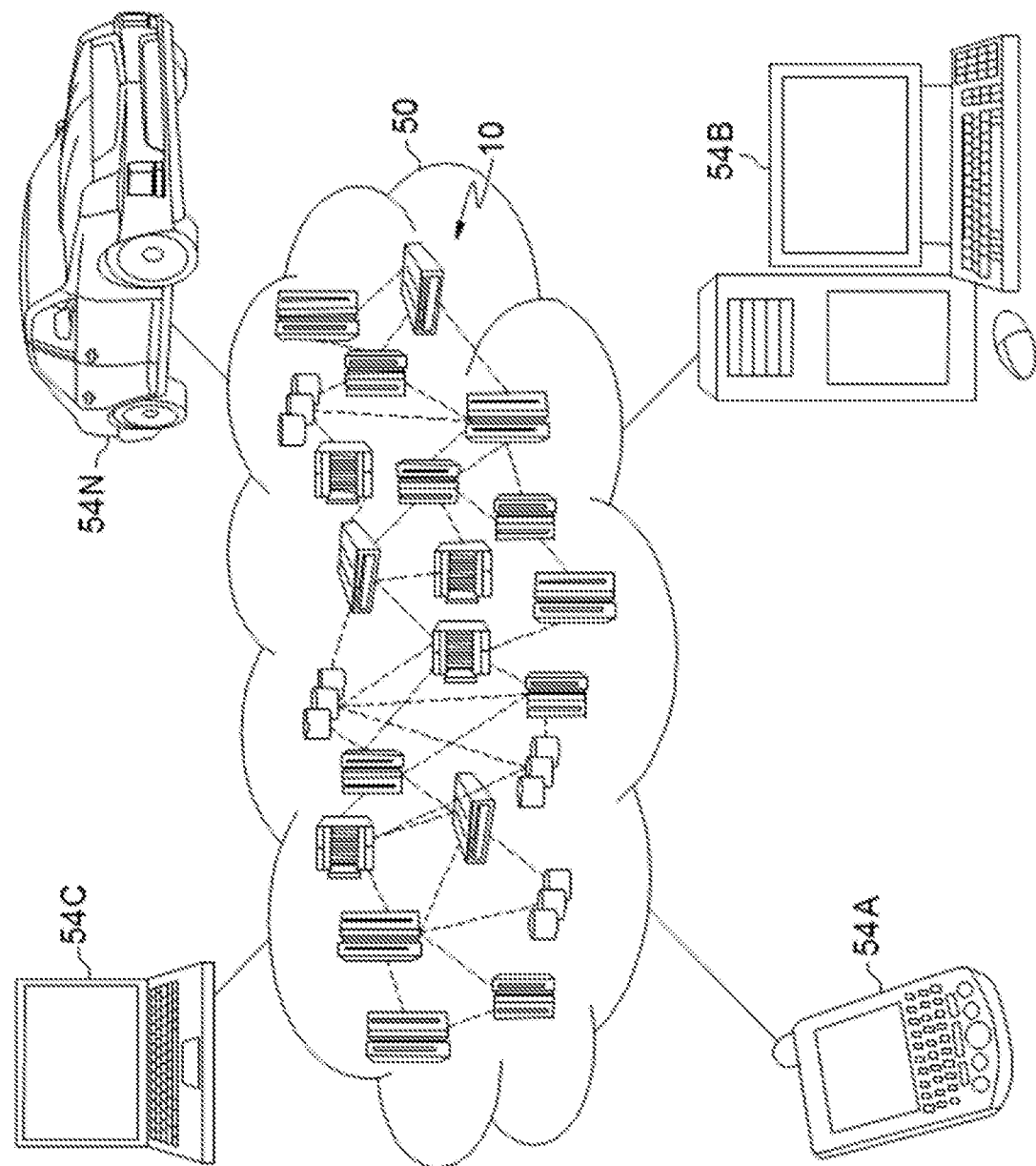
FIG. 8 depicts a cloud computing environment 50 according to an embodiment of e present invention.

Referring now to FIG. 8, illustrative cloud-computing environment 50 is depicted. As shown, cloud-computing environment 50 comprises one or more cloud-computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud-computing environment 50 to offer infrastructure, platforms and/or software as services for which a cloud consumer does not need to maintain resources on a local computing circuit. It is understood that the types of computing circuits 54A-N shown in FIG. 8 are intended to be illustrative only and that computing nodes 10 and cloud-computing environment 50 can communicate with any type of computerized circuit over any type of network and/or network addressable connection (e.g., using a web browser).

Figure 9:
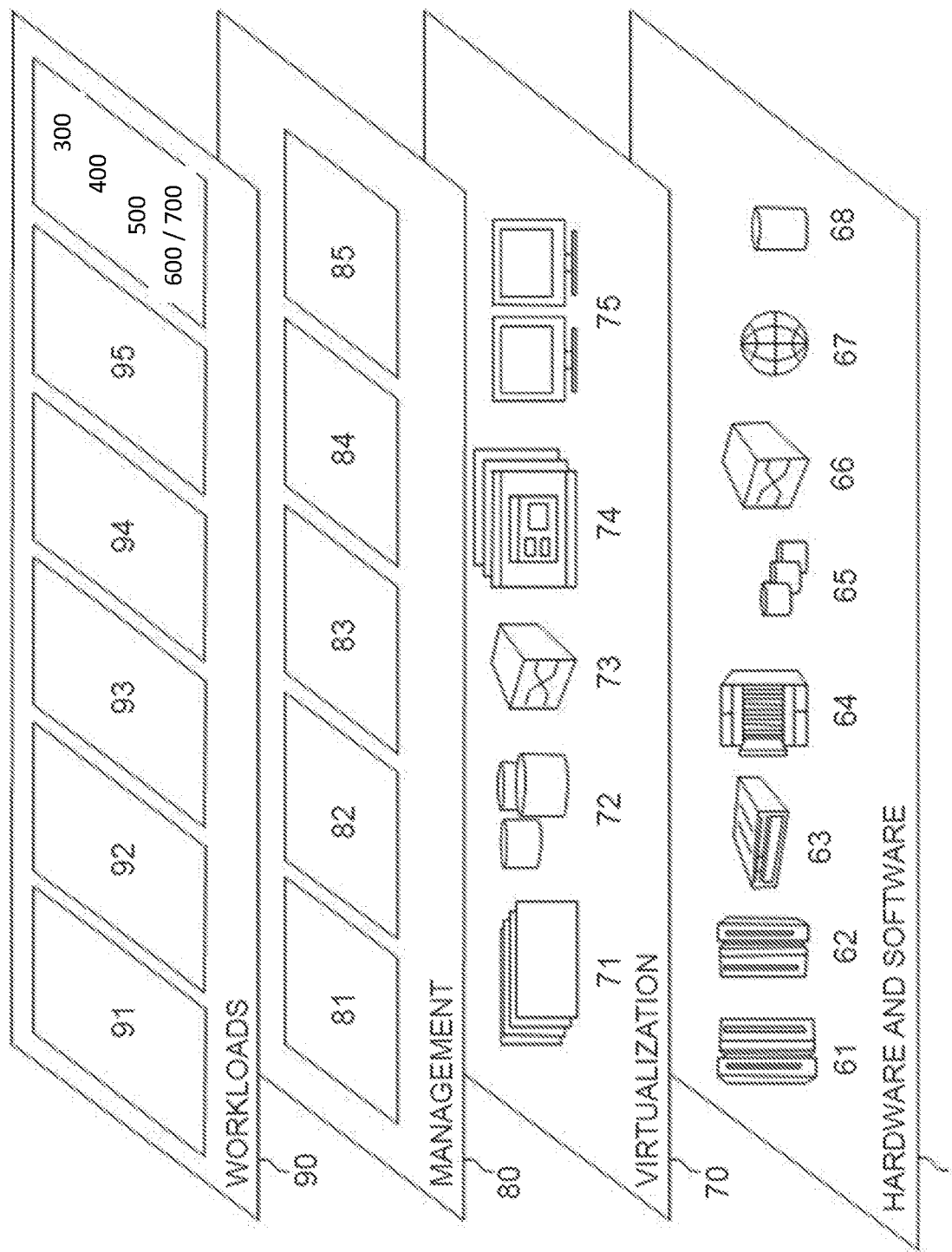
FIG. 9 depicts abstraction model layers according to an embodiment of the present invention.

Referring now to FIG. 9, an exemplary set of functional abstraction layers provided by cloud-computing environment 50 (FIG. 8) is shown. It should be understood in advance that the components, layers, and functions shown in FIG. 9 are intended to he illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud-computing environment. Metering and Pricing 82 provide cost tracking as resources are utilized within the cloud-computing environment, and billing or invoicing for consumption of these resources. In one example, these resources may comprise application software licenses. Security provides identity verification for cloud consumers and tasks, as well as protection for data and other resources. User portal 83 provides access to the cloud-computing environment for consumers and system administrators. Service level management 84 provides cloud-computing resource allocation and management such that required service levels are met. Service Level Agreement (SLA) planning and fulfillment 85 provide pre-arrangement for, and procurement of, cloud-computing resources for which a future requirement is anticipated in accordance with an SLA.

Workloads layer 90 provides examples of functionality for which the cloud-computing environment may be utilized, Examples of workloads and functions which may be provided from this layer include: mapping and navigation 91; software development and lifecycle management 92; virtual classroom education delivery 93; data analytics processing 94; transaction processing 95; and, more particularly relative to the present invention, the distributed computation method 400.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage mediums may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media e.g., licit pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry; in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A system for fault detection, comprising:
a processor; and
a memory, the memory storing instructions to cause the processor to perform:
recording wave data of a cycle that indicates an electric current, an electric field or a combination thereof that is collected from local sensors and that is collected from adjacent sensors that are adjacent to one of the local sensors in a power grid, the power grid having a plurality of sensors distributed in the power grid to compare the wave data with historical fault data to detect an actual fault region in the power grid, each of the local sensors being upstream of one adjacent sensor and downstream of an other adjacent sensor; and
performing a subsequent verification to verify the actual fault region based on a comparison with the adjacent sensor,
wherein, if each of the local sensors corroborate each other, then the first data and second data are correlated in order to combine a fault type from the local sensors into a fault type with a higher fault possibility.

2. The system of claim 1, further comprising:
identifying a region of the power grid as a candidate fault region for including a potential fault by identifying the region as the candidate fault region based only on first data in the wave data,
after the identifying, verifying the identified candidate fault region, during the performing the subsequent verification, as an actual fault region based only on second data in the wave data.

3. The system of claim 2, wherein the identifying a region as a candidate fault region comprises:
retrieving historical normal data collected by the first sensor from a repository;
determining a first similarity between the first data and the historical normal data; and
identifying the region as the candidate fault region by comparing the first similarity with a first threshold.

4. The system of claim 3, wherein the identifying a region as a candidate fault region comprises:
retrieving the historical fault data collected by the plurality of sensors from a repository;
determining a second similarity between the first data and the historical fault data; and
identifying the region as the candidate fault region by comparing the second similarity with a second threshold.

5. The system of claim 1, wherein the plurality of sensors are distributed in the power grid at uneven distances from one another.

6. The system of claim 1, wherein the power grid comprises a plurality of power lines, and
wherein the plurality of sensors are mounted to each of the plurality of power lines such that each sensor corresponds to each power line.

7. The system of claim 1, further comprising performing a preliminary identification of a candidate fault region based only on the wave data collected by the sensor; and wherein the subsequent verification is performed on the preliminary identification of the candidate fault region.

8. The system of claim 1, outputting the detected actual fault region in the power grid to a human for an intervention.

9. A computer-implemented method for fault detection comprising:

recording wave data of a cycle that indicates an electric current, an electric field or a combination thereof that is collected from local sensors and that is collected from adjacent sensors that are adjacent to one of the local sensors in a power grid, the power grid having a plurality of sensors distributed in the power grid to compare the wave data with historical fault data to detect an actual fault region in the power grid, each of the local sensors being upstream of one adjacent sensor and downstream of an other adjacent sensor; and performing a subsequent verification to verify the actual fault region based on a comparison with the adjacent sensor, wherein, if each of the local sensors corroborate each other, then the first data and second data are correlated in order to combine a fault type from the local sensors into a fault type with a higher fault possibility.

10. A computer program product for a fault detection system interacting with a power grid that includes:

a first sensor at a first location;

a second sensor at a second location that is downstream of the first location in the power grid, a first region being disposed between the first sensor and the second sensor; and a third sensor at a third location that is downstream of the second location in the power grid, a second region being disposed between the second sensor and the third sensor, the computer program product comprising a computer-readable storage medium having program instructions embodied therewith, the program instructions being executable by a computer to cause the computer to perform:

recording wave data of a cycle that indicates an electric current, an electric field or a combination thereof that is collected from each of the first sensor, the second sensor, and the third sensor, the wave data of the second sensor being compared with historical fault data to detect an actual fault region in the power grid; and performing a subsequent verification to verify the actual fault region based on a comparison with the wave data of the first sensor and the third sensor to determine if the actual fault region in the power grid is the first region or the second region, wherein, if the third sensor corroborates the second sensor, then the wave data of the second sensor and wave data of the third sensor are correlated in order to combine a fault type from the second sensor and the third sensor into a fault type of the second region with a higher fault possibility.

* * * * *